(12) United States Patent
Miyazawa et al.

(10) Patent No.: US 9,738,184 B2
(45) Date of Patent: Aug. 22, 2017

(54) RIDING SEAT STRUCTURE FOR PASSENGER VEHICLE, AND VEHICLE INCLUDING SAME

(71) Applicant: HONDA MOTOR CO., LTD., Minato-Ku, Tokyo (JP)

(72) Inventors: Yoshiyuki Miyazawa, Wako (JP); Tatsuya Shiokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/159,294

(22) Filed: May 19, 2016

(65) Prior Publication Data

US 2016/0347214 A1     Dec. 1, 2016

(30) Foreign Application Priority Data

May 26, 2015   (JP) ................................. 2015-106159

(51) Int. Cl.
*B60N 2/02* (2006.01)
*B60N 2/30* (2006.01)

(52) U.S. Cl.
CPC ........... *B60N 2/3065* (2013.01); *B60N 2/309* (2013.01); *B60N 2/3097* (2013.01)

(58) Field of Classification Search
CPC ..... B60N 2/3065; B60N 2/309; B60N 2/3097
See application file for complete search history.

(56) References Cited

U.S. PATENT DOCUMENTS 6,270,161 B1 *   8/2001   De Filippo .......... B60N 2/4817
                                                        297/391

FOREIGN PATENT DOCUMENTS

| DE | 20015115 U1 * | 1/2002 | ........... B60N 2/0224 |
| DE | 10344978 A1 * | 5/2005 | ........... B60N 2/3065 |
| DE | 102004014605 B3 * | 10/2005 | ............... B60N 2/30 |
| JP | 4690992 B2 | 6/2011 | |

* cited by examiner

*Primary Examiner* — Lori L Lyjak
(74) *Attorney, Agent, or Firm* — Carrier Blackman & Associates, P.C.; Joseph P. Carrier; William D. Blackman (57) ABSTRACT

A seat supporting member designed to support, from below, a seat member in its closed position, is provided on a body frame for allowing the seat member to be attached to and detached from the seat supporting member. A rear part of the seat member and an intermediate part of the seat supporting member in a front-rear direction thereof are connected to each other via a swinging arm. The seat member is supported on a body frame while its position is variable between a closed position where the seat member allows an occupant to sit thereon while covering at least one of maintenance spaces and a housing space from above; and an open position where an upper opening of the at least one of the maintenance spaces and the housing space is widely, almost completely opened.

20 Claims, 11 Drawing Sheets

RIDING SEAT STRUCTURE FOR PASSENGER VEHICLE, AND VEHICLE INCLUDING SAME

CROSS-REFERENCE TO RELATED APPLICATIONS

The present invention claims priority under 35 USC 119 based on Japanese Patent Application No. 2015-106159, filed on May 26, 2015. The entire subject matter of this priority document, including specification claims and drawings thereof, is incorporated by reference herein.

BACKGROUND OF THE INVENTION

1. Field of the Invention

The present invention relates to a riding seat structure in which a seat member which constitutes a part of a riding seat is supported on a body frame of a vehicle while its position is variable between a closed position where the seat member allows an occupant to sit thereon while covering at least one of maintenance spaces and a housing space from above; and an open position where the at least one of the maintenance space and the housing space is opened, and to a vehicle including the same. More particularly, the present invention relates to an improvement to a riding seat structure which enables an upper opening of a housing space and a maintenance space to be widely opened when a seat member is in its open position, and to a vehicle including the same.

2. Description of the Background Art

There is known, for example, as disclosed in the Japanese Patent No. 4690992, a service vehicle in which a seat member being a part of a riding seat is turnably supported at its front part in a vehicle front-rear direction by a front part of a seat supporting member constituting a part of a body frame via a hinge, and the seat member is turnable between a closed position where the seat member allows an occupant to sit thereon while covering, from above, a storage box that is disposed above a fuel tank and attachable to and detachable from the seat supporting member; and an open position where the storage box is opened.

However, when one tries to carry out maintenance of the fuel tank in the vehicle disclosed in the Japanese Patent No. 4690992 by turning the seat member to its open position and taking the storage box out, an opening portion provided in the seat supporting member to let the fuel tank be exposed to the outside cannot be opened widely since the seat member in its open position is located between a group of a steering wheel and an instrument panel, and the opening portion. Hence, maintenance work is hard to carry out. Accordingly, how to increase a space for maintenance work is an issue to be resolved.

The present invention has been made in view of the above circumstances. Accordingly, it one of the objects of the present invention to provide a riding seat structure in a passenger vehicle which enables an upper opening of at least one of a housing space and a maintenance space to be widely opened when a seat member is in its open position.

SUMMARY OF THE INVENTION

In order to achieve the above objects, the present invention according to a first aspect thereof provides a riding seat structure for a passenger vehicle in which a seat member (seat seating member) constituting a part of a riding seat is supported on a body frame while a position thereof is variable between a closed position where the seat member allows an occupant to sit thereon while covering at least one of a maintenance space and a housing space from above; and an open position where the at least one of the maintenance space and the housing space is opened, is characterized in that a seat supporting member designed to support, from below, the seat member in the closed position is provided on the body frame so as to allow the seat member to be attached to and detached from the seat supporting member, and a rear part of the seat member and an intermediate part in a front-rear direction of the seat supporting member are connected to each other via a swinging arm.

Further, the present invention according to a second aspect thereof, in addition to the first aspect, is characterized in that the seat member is provided with a seating sensor configured to detect whether an occupant is seated on the seat member, and a sensor cord extending continuously from the seating sensor is routed along the swinging arm.

The present invention according to a third aspect thereof, in addition to the second aspect, is characterized in that the sensor cord is held by the swinging arm.

The present invention according to a fourth aspect thereof, in addition to one of the first to third aspects, is characterized in that a position of connection of the swinging arm to the seat member and to the seat supporting member is set such that a front edge portion of the seat member in the open position is located between the seat supporting member, and an instrument panel disposed ahead of, in front of the seat supporting member.

The present invention according to a fifth aspect thereof, in addition to the fourth aspect, is characterized in that the seat supporting member is provided on the body frame so as to stand upward on a front floor (supported on the front part of the body frame F), and the seat member in the open position is supported by the swinging arm and a front surface of the seat supporting member so that the front edge portion of the seat member in the open position is placed at a position leaving a clearance above an upper surface of the front floor.

The present invention according to a sixth aspect thereof, in addition to one of the first to fifth aspects, is characterized in that the swinging arm made of metal is arranged so as to be turnable about a supporting point which is a unit of connecting one end part of the swinging arm to the seat supporting member.

Further, the present invention according to a seventh aspect thereof, in addition to the configuration according to the sixth aspect, is characterized in that a slotted hole that extends long in the front-rear direction when the seat member is in the closed position is provided in the one end part of the swinging arm so as to allow a connecting shaft as the connecting unit provided at the intermediate part in the front-rear direction of the seat supporting member to penetrate therethrough, and a fitting protrusion capable of fitting into a fitting hole, which is provided in a rear part of the seat supporting member and opens toward a front, protrudes on the rear part of the seat member.

Effects of the Invention

According to the first aspect of the present invention, the intermediate part in the front-rear direction of the seat supporting member provided on the body frame is connected to the rear part of the seat member via the swinging arm. Such arrangement enables the seat member in its open position to be located ahead of the seat supporting member while not projecting greatly above the seat supporting member, and by displacing the seat member to its open position, it is possible to make the upper opening of at least one of the maintenance space and the housing space widely open.

Further, according to the second aspect of the present invention, the sensor cord extending continuously from the seating sensor provided to the seat member is routed along the swinging arm. Accordingly, it is not necessary to detach the sensor cord at the time of displacing the seat member to its open position, whereby the work of detaching the sensor cord does not have to be performed and thus workability can be improved.

According to the third aspect of the present invention, the sensor cord is held by the swinging arm. Thereby, the sensor cord is held by the swinging arm when the seat member is displaced to its open position, whereby workability can be further improved.

According to the fourth aspect of the present invention, the front edge portion of the seat member in its open position is located between the seat supporting member and the instrument panel. Thereby, the seat member in its open position is disposed by use of a large floor part located in front of the riding seat, whereby a large amount of displacement of the seat member from the closed position to the open position can be secured.

According to the fifth aspect of the present invention, the front edge portion of the seat member in its open position does not make contact with the upper surface of the front floor. Such arrangement makes it possible to prevent the front edge portion of the seat member from becoming soiled due to contact with the front floor.

According to the sixth aspect of the present invention, the swinging arm made of metal turns about the supporting point which is the unit of connecting the one end part of the swinging arm to the seat supporting member. Thereby, when the seat member is returned from the open position to the closed position, the seat member can be returned to the closed position while being turned along the shape of a fan by the swinging arm, whereby workability can be further improved.

Further, according to the seventh aspect of the present invention, the slotted hole that extends long in the front-rear direction when the seat member is in its closed position is provided in the one end part of the swinging arm, the connecting shaft penetrating the slotted hole is provided at the intermediate part in the front-rear direction of the seat supporting member, and the fitting protrusion capable of fitting into the fitting hole, which is provided in the rear part of the seat supporting member and opens toward the front, protrudes on the rear part of the seat member. Accordingly, the seat member can be slid in the front-rear direction by means of the slotted hole in a state where the seat member is located at or near its closed position, and thus the fitting protrusion can be fitted into and released from the fitting hole with the seat member situated in its closed position. Thereby, it is possible to simplify the structure for supporting the seat member on the seat supporting member when the seat member is in its closed position.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An illustrative embodiment of the present invention will be described with reference to attached FIGS. 1 to 11. Again, it may be noted that, throughout the following description, terms such as front, rear, left, right, up, and down represent directions viewed by a rider riding on a four wheel drive vehicle for driving over rough terrain.

Figure 1:
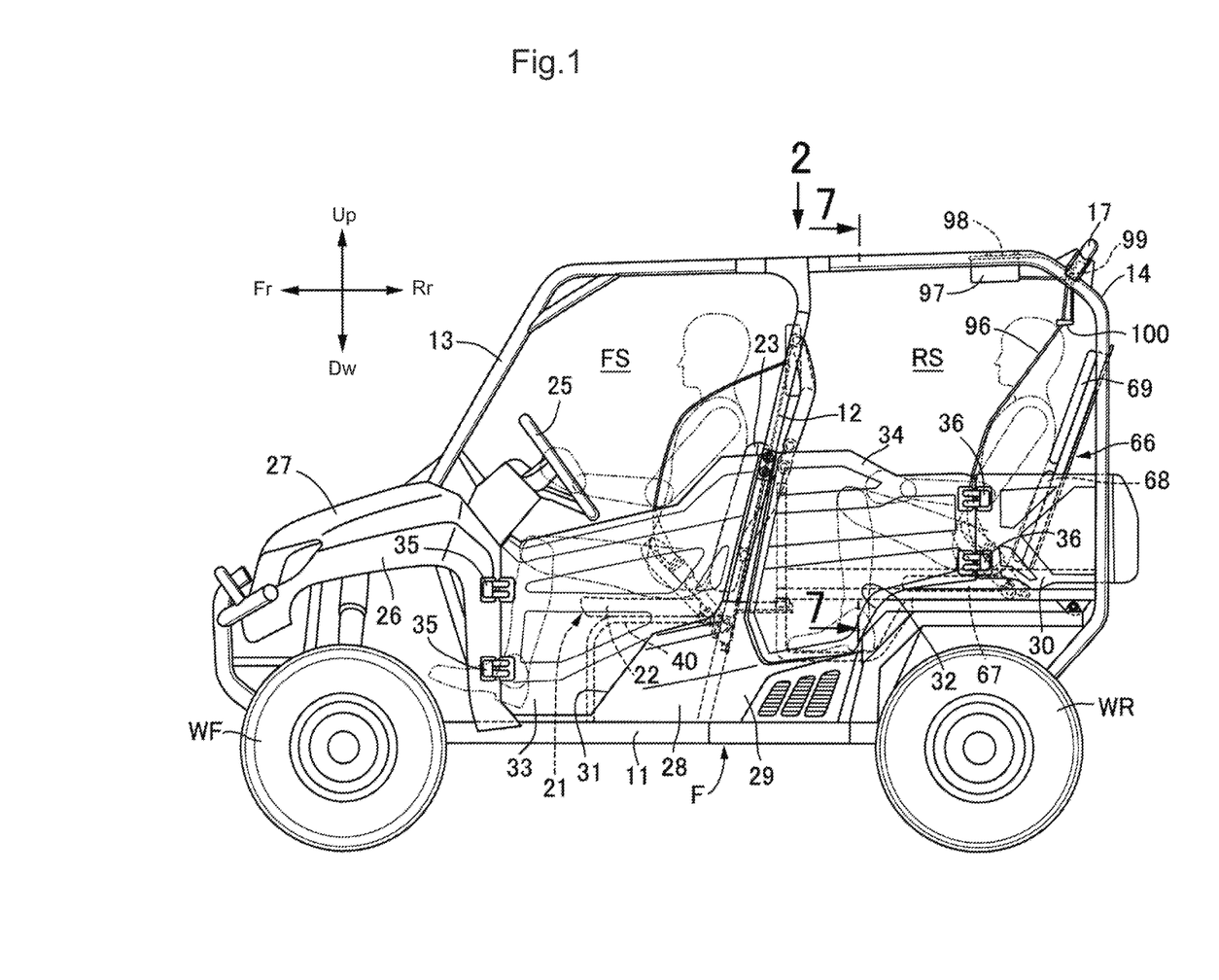
FIG. 1 is a side view of a four wheel drive vehicle for driving over rough terrain.
Figure 2:
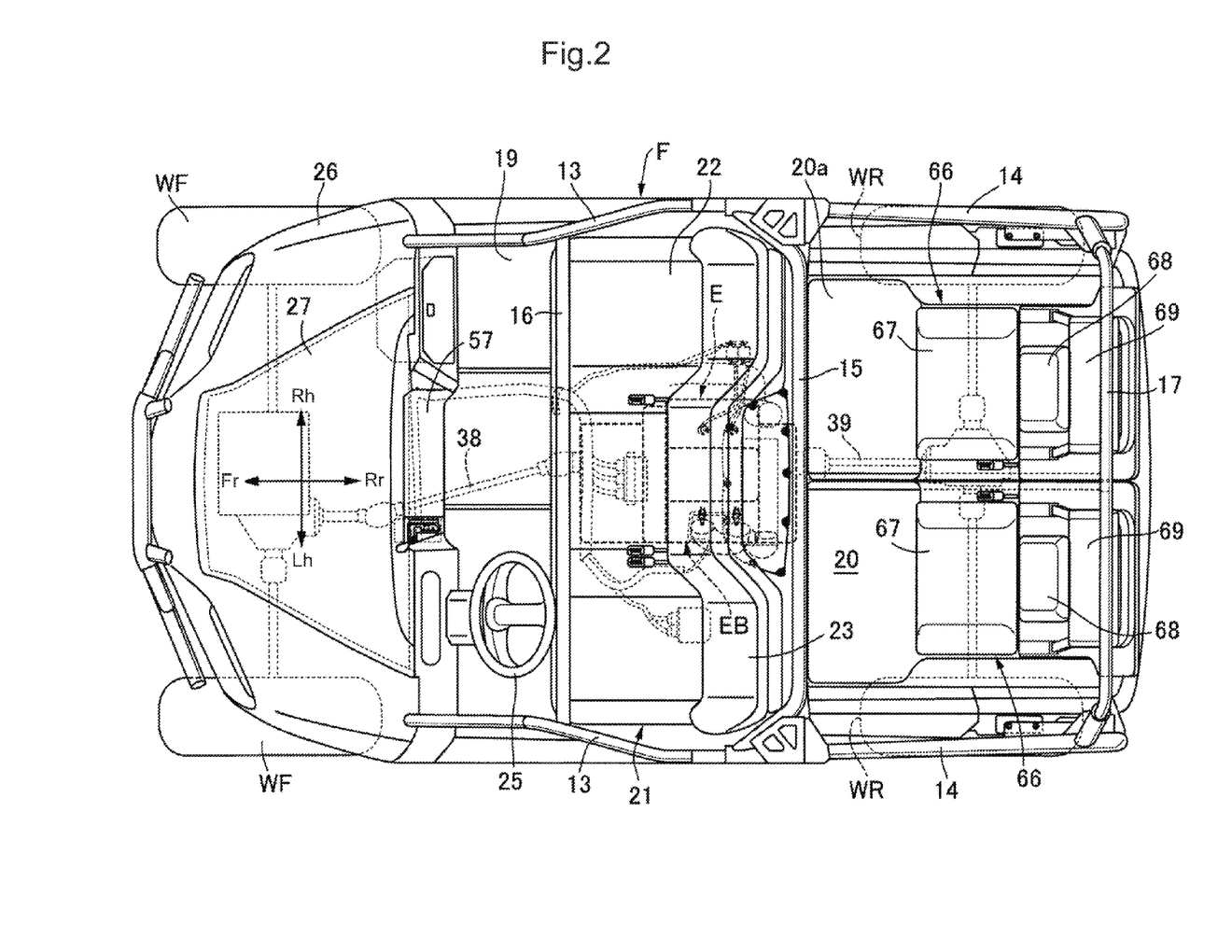
FIG. 2 is a view as viewed in the direction of an arrow 2 in FIG. 1.

First, as shown in FIGS. 1 and 2, a vehicle 10 includes a body frame F, a pair of left and right front wheels WF suspended from a front part of the body frame F, and a pair of left and right rear wheels WR is suspended from a rear part of the body frame F. The vehicle 10 is a four wheel drive suitable for driving over rough terrain.

The body frame F includes a pair of left and right lower frames 11 that extend in a front-rear direction; a pair of left and right center standing frames 12 that stand upward on intermediate parts in the front-rear direction of the lower frames 11 respectively; a pair of left and right front side frames 13 that extend forward from upper ends of the center standing frames 12 respectively, extend forward and downward from the midpoint, and are then connected to front parts of the lower frames 11 respectively; a pair of left and right rear side frames 14 that extend rearward from the upper ends of the center standing frames 12 respectively, extend downward at the midpoint, and are then connected to rear parts of the lower frames 11 respectively; an upper center cross frame 15 that couples upper end parts of the respective paired left and right center standing frames 12 to each other; a front cross frame 16 that couples intermediate bending parts of the respective paired left and right front side frames 13 to each other; and an upper rear cross frame 17 that couples intermediate bending parts of the respective paired left and right rear side frames 14 to each other.

The pair of left and right center standing frames 12 and the pair of left and right front side frames 13 define the contour of a front riding space FS for a driver and a front passenger, and a front floor 19 disposed ahead of the pair of center standing frames 12 is supported on the front part of the body frame F so as to allow the driver and the front passenger to ride thereon.

Further, the pair of left and right center standing frames 12 and the pair of left and right rear side frames 14 define the contour of a rear riding space RS for fellow passengers, and a loading space 20 disposed behind the pair of center standing frames 12 is supported on the rear part of the body frame F.

A bench type riding seat 21 integrally having a driver's seat, a front passenger's seat, and an auxiliary seat arranged on the front floor 19 supported on the front part of the body frame F is installed in the front riding space FS for a driver and a front passenger. The driver's seat and the front passenger's seat are spaced apart from each other in a vehicle widthwise direction, and the auxiliary seat is disposed between the driver's seat and the front passenger's seat. In the illustrative embodiment, a left side portion of the riding seat 21 corresponding to a steering wheel 25 disposed in front of the riding seat is defined as the driver's seat. However, driver seat may be located at right side portion of the riding seat corresponding to position of steering wheel.

A front cover 26 designed to openably and closably support a hood 27 is supported on the front part of the body frame F so as to cover the pair of left and right front wheels WF from above. In addition, a pair of front side covers 28 designed to cover a rear lower part of the front riding space FS from the lateral sides, a pair of left and right center side covers 29 designed to cover a front lower part of the rear riding space RS from the lateral sides, and a pair of left and right rear side covers 30 designed to cover a rear lower part of the rear riding space RS from the lateral sides are attached to the body frame F.

In addition, a paired left and right front doors 33 capable of respectively opening and closing paired front doorways 31 that are formed between the respective front side covers 28 and the front cover 26 are supported at respective left and right rear parts of the front cover 26 so that each front door is turnable about a pair of top and bottom hinge units 35. A paired rear doors 34 capable of respectively opening and closing paired rear doorways 32 that are formed between the respective sets of the center side cover 29 and the rear side cover 30 are supported at front parts of the rear side covers 30 respectively so that each rear door is turnable about a pair of top and bottom hinge units 36.

An engine E is supported on the body frame F, and disposed below the riding seat 21 at a central part thereof in the vehicle widthwise direction. A front-wheel drive shaft 38 configured to drive the pair of left and right front wheels WF extends forward from an engine body EB of the engine E. A rear-wheel drive shaft 39 configured to drive the pair of left and right rear wheels WR extends rearward from the engine body EB.

Figure 3:
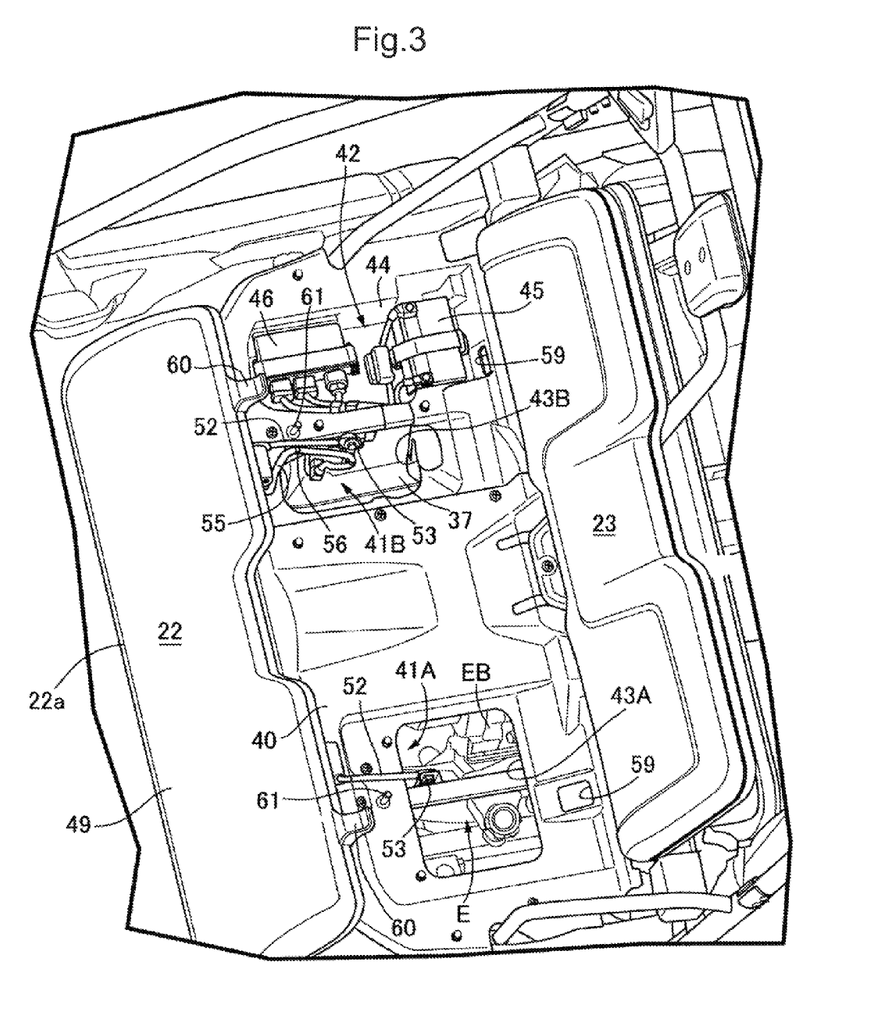
FIG. 3 is a perspective view of a riding seat and its surroundings in a state where a seat member is located in its open position.
Figure 4:
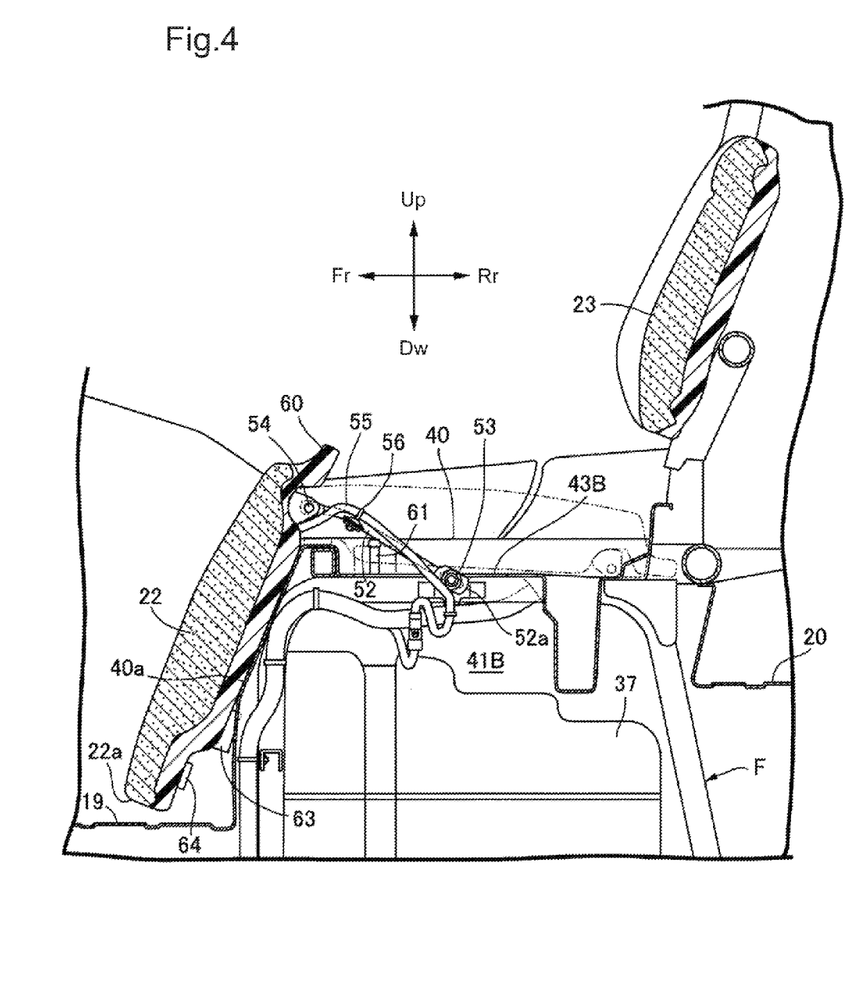
FIG. 4 is a longitudinal sectional view of the riding seat and its surroundings in the state where the seat member is located in its open position.

Also referring to FIGS. 3 and 4, the riding seat 21 includes a seat member (seat seating member) 22; and a seat back portion 23 that is fixedly supported on the body frame F so as to stand upward behind the seat member 22. The seat member 22, which constitutes a part of the riding seat 21, is supported on the body frame F such that its position is variable between: a closed position where an occupant can sit on the seat as illustrated by a solid line in FIG. 2 and a chain line of FIG. 4; and an open position illustrated by solid lines in FIGS. 3 and 4.

A seat supporting member 40 designed to support, from below, the seat member 22 in its closed position is provided on the body frame F so as to stand upward on the front floor 19 while allowing the seat member 22 to be attached to and detached from the seat supporting member 40. A maintenance space 41 is formed of a first maintenance space 41A and a second maintenance space 41B.

The seat supporting member 40 has a first opening portion 43A that opens to face the first maintenance space 41A for facilitating maintenance of the engine body EB of the engine E and its surroundings; a second opening portion 43B that opens to face the second maintenance space 41B for facilitating maintenance of a fuel tank 37 disposed at a right front side of the engine body EB; and a housing recess portion 44 that opens toward the top to define a housing space 42 housing therein a battery 45, a control unit 46, and the like.

When at the closed position, the seat member 22 allows an occupant to sit thereon while covering at least one (or all as shown in the illustrative embodiment) of the first maintenance space 41A, the second maintenance space 41B, and the housing space 42 from above, and when at the open position, the at least one (or all as shown in the illustrative embodiment) of the first maintenance space 41A, the second maintenance space 41B, and the housing space 42 is opened.

Figure 5:
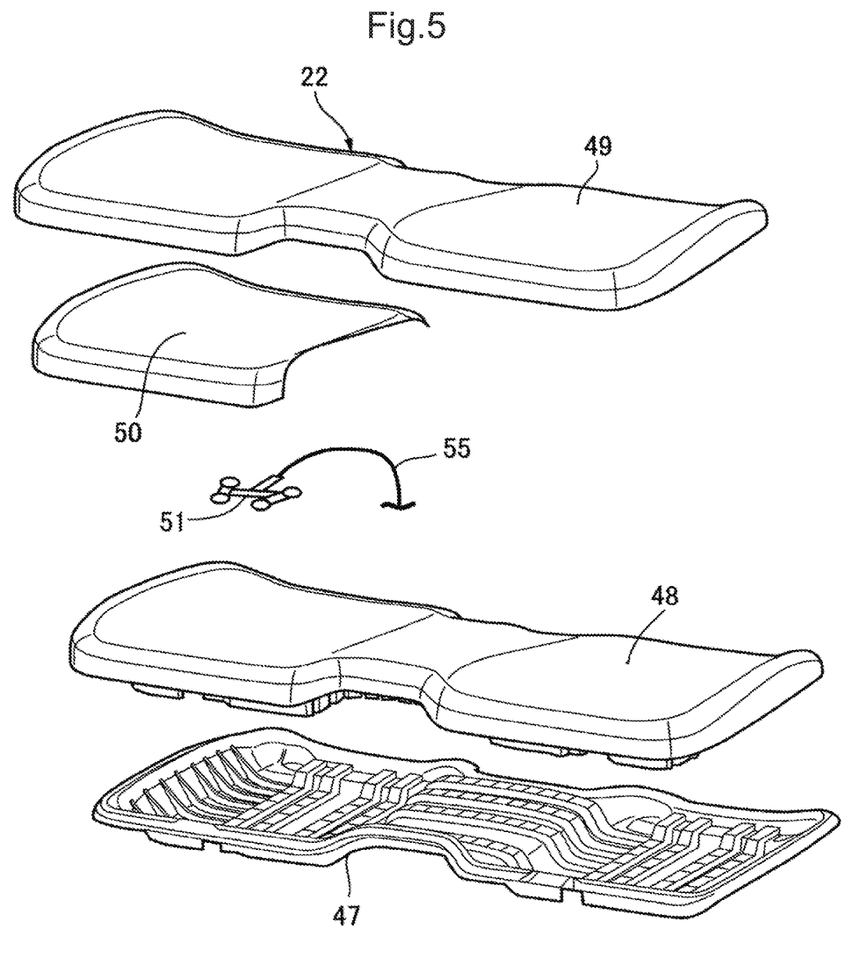
FIG. 5 is an exploded perspective view of the seat member.

As shown in FIG. 5, the seat member 22 includes a bottom plate 47; a cushion 48 that is provided on the bottom plate 47; and a top coat 49 that covers the cushion 48 from above. The seat member 22 is provided with a seating sensor 51 configured to detect whether an occupant is seated on the front passenger's seat side of the seat.

In the illustrative embodiment, the seating sensor 51 is placed to be sandwiched between the cushion 48 and the top coat 49, and an urethane sheet 50 designed to cover the seating sensor 51 is sandwiched between the cushion 48 and the top coat 49 in order that an occupant seated on the front passenger's seat side of the seat member 22 not feel a sense of discomfort due to the presence of the seating sensor 51.

A rear part of the seat member 22 and an intermediate part in the front-rear direction of the seat supporting member 40 are connected to each other via a pair of metallic swinging arms 52 that are spaced apart from each other in the vehicle widthwise direction. Each swinging arm 52 is formed to extend linearly.

Each swinging arm 52 has a flat plate-shaped connecting plate portion 52a at its one end portion, and the connecting plate portion 52a is turnably connected to the seat supporting member 40 via a connecting shaft 53. In other words, the swinging arm 52 is supported on the intermediate part in the front-rear direction of the seat supporting member 40 so as to be turnable about a unit of connecting the one end part to the seat supporting member 40, i.e., the connecting shaft 53 as a supporting point. In addition, the other end part of the swinging arm 52 is turnably connected to a rear part of the bottom plate 47 of the seat member 22 via a shaft 54.

The paired swinging arms 52 are provided between the rear part of the seat member 22 and the intermediate part in the front-rear direction of the seat supporting member 40 at positions respectively corresponding to the driver's seat and the front passenger's seat. A sensor cord 55 extending continuously from the seating sensor 51 is routed along the swinging arm 52 disposed on the front passenger's seat side. Moreover, the sensor cord 55 is held by the swinging arm 52 on the front passenger's seat side. The sensor cord 55 is held with a clip 56 attached to the swinging arm 52 on the front passenger's seat side.

The positions of connection of the swinging arms 52 to the seat member 22 and to the seat supporting member 40 are set so that a front edge portion 22a of the seat member 22 in its open position may be located between the seat supporting member 40 and an instrument panel 57 that is disposed ahead of the seat supporting member 40 and supported on the front part of the body frame F.

Moreover, as illustrated in FIG. 4, the seat member 22 in its open position is supported by the swinging arms 52 and a front surface 40a of the seat supporting member 40 so that the front edge portion 22a of the seat member 22 in its open position may be placed at a position leaving a clearance above an upper surface of the front floor 19.

Figure 6A:
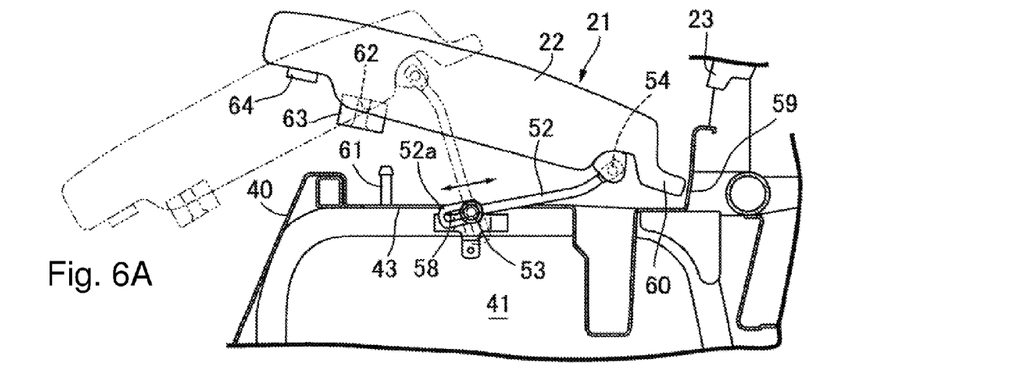
FIGS. 6A to 6C are longitudinal sectional side views illustrating, in sequential order, states of the seat member when it is returned back to its closed position.
Figure 6B:
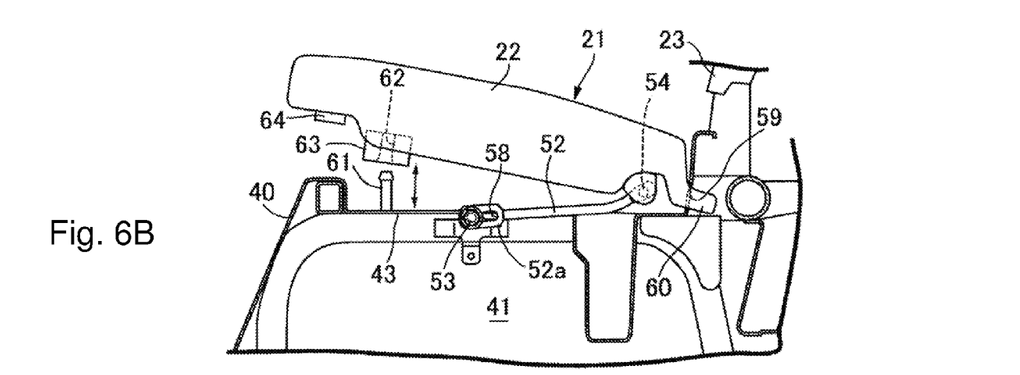
Figure 6C:
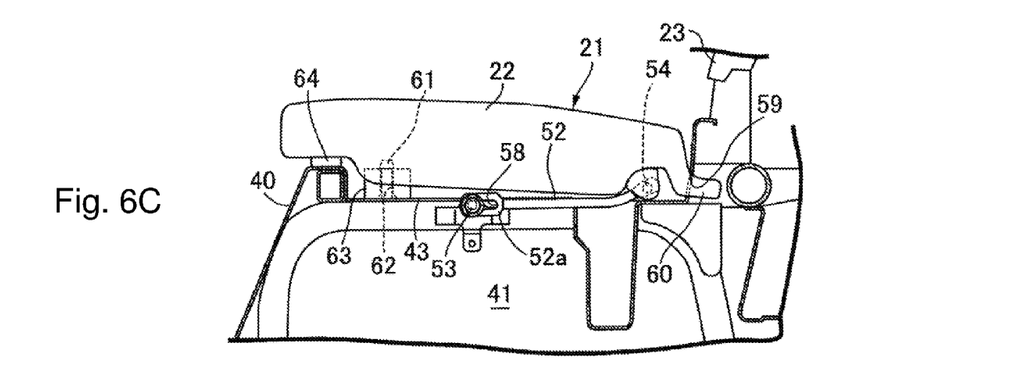

Referring also to FIGS. 6A-6C, in the connecting plate portion 52a located at the one end part of each swinging arm 52, a slotted hole 58 that extends long in the longitudinal direction of the swinging arm 52 so as to allow the connecting shaft 53 provided at the intermediate part in the front-rear direction of the seat supporting member 40 to penetrate therethrough is provided to extend along the front-rear direction when the seat member 22 is in its closed position.

In addition, a pair of fitting holes 59 spaced apart from each other in the vehicle widthwise direction is provided in a rear part of the seat supporting member 40 so as to open toward the front, and a pair of fitting protrusions 60 capable of fitting into the fitting holes 59 protrudes on the rear part of the seat member 22. Here, in this embodiment, the paired fitting holes 59 may be formed in different shapes to match the peripheries of the fitting protrusions 60.

Further, regulatory protrusions 61 protruding upward are provided at two parts of the seat supporting member 40 that are spaced apart from each other in the vehicle widthwise direction. Regulatory members 63 integrally having regulatory holes 62 respectively are fixedly attached to the bottom plate 47 of the seat member 22. The regulatory holes 62 are designed to receive therein the corresponding regulatory protrusions 61 when the seat member 22 is in its closed position.

With reference to FIGS. 6A-6C, in a state where the seat member 22 placed closer to its closed position as illustrated by a solid line from a position illustrated by a chain line while it is displaced from its open position to its closed position, firstly, the seat member 22 is slid rearward in the front-rear direction to such a degree that the connecting shaft 53 located in a rear part of the slotted hole 58 (see FIG. 6A) moves to a front part of the slotted hole 58 (see FIG. 6B) so as to fit the fitting protrusion 60 into the fitting hole 59, and then the seat member 22 is turned to its closed position (see FIG. 6C) to fit the regulatory protrusion 61 into the regulatory hole 62. Thereby, the seat member 22 is held in its closed position.

In addition, an elastic member 64 designed to make contact with an upper surface of the seat supporting member 40 when the seat member 22 is in its closed position is attached to a front part of a lower surface of the bottom plate 47 of the seat member 22.

Figure 7:
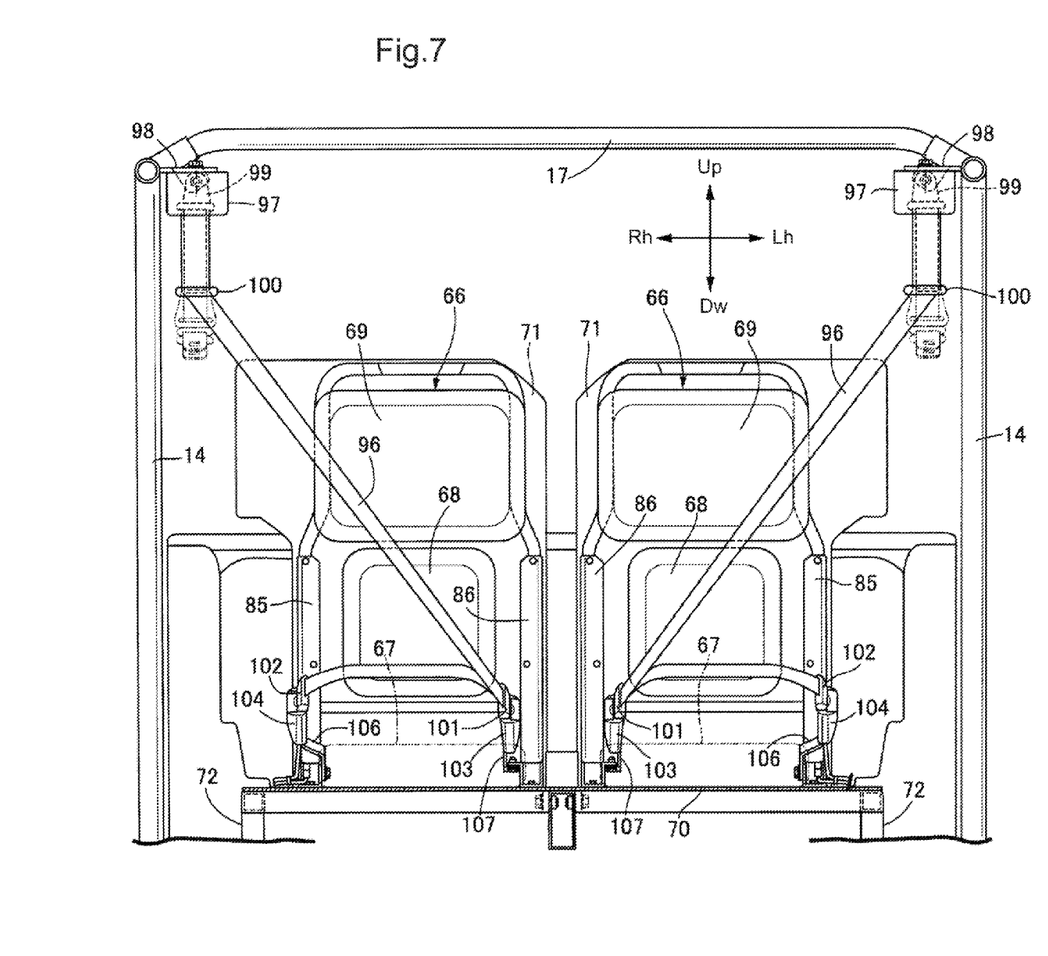
FIG. 7 is a view taken along a line 7-7 in FIG. 1.
Figure 8:
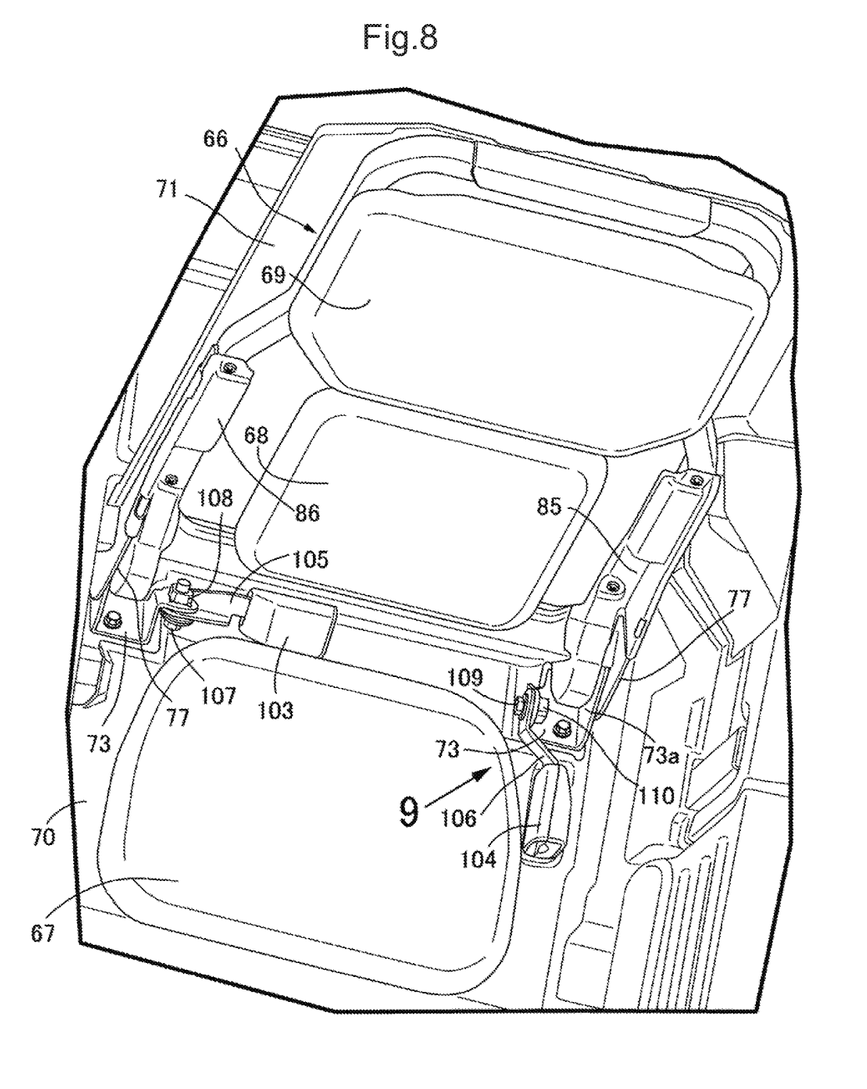
FIG. 8 is a perspective view of a fellow passenger's seat.

Referring to FIGS. 7 and 8, a pair of left and right fellow passenger's seats 66 disposed in the rear riding space RS is provided on the loading space 20. Each fellow passenger's seat 66 includes a seat member 67 that is designed for a fellow passenger to sit on; a first seat back portion 68 that is designed to support a lower part of the back of a fellow passenger seated on the seat member 67; and a second seat back portion 69 that is disposed above the first seat back portion 68 so as to support an upper part of the back of a fellow passenger seated on the seat member 67.

The loading space 20 is supported on the rear part of the body frame F and opens toward the top, a seating-portion frame 70 is mounted on a floor portion 20a of the loading space 20, and the seat members 67 are arranged on the seating-portion frame 70. In the illustrative embodiment, the seating-portion frame 70 is mounted on frame supporting frames 72 that are provided on the floor portion 20a and stand upward.

In addition, sets of the first seat back portion 68 and the second seat back portion 69 vertically spaced apart from each other are respectively supported by seat back frames 71. Each seat back frame 71 is supported on the body frame F while its mode is switchable between a folded-down mode where the first seat back portion 68 and the second seat back portion 69 are laid over the seat member 67; and an erected mode where the first seat back portion 68 and the second seat back portion 69 stand behind the seat member 67.

Figure 9:
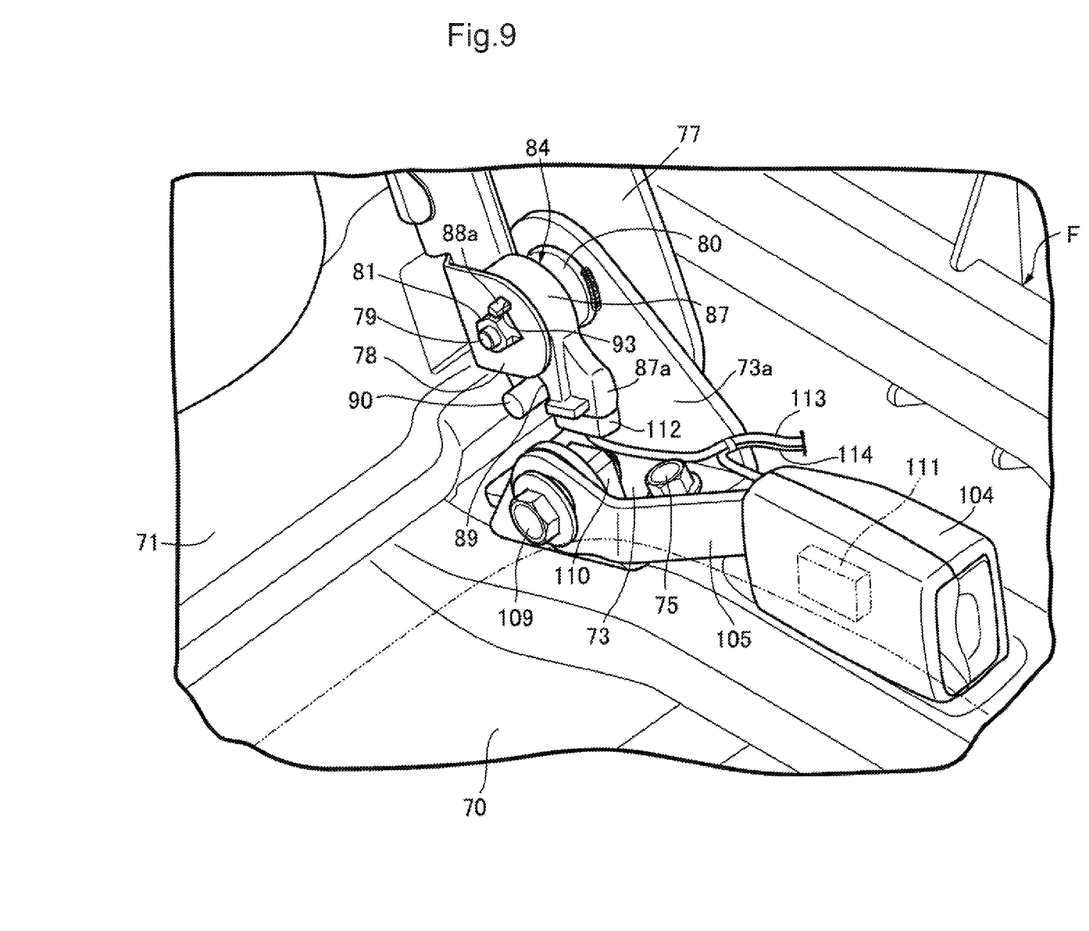
FIG. 9 is a perspective view as viewed in the direction of an arrow 9 in FIG. 8 with a cover member omitted.
Figure 10:
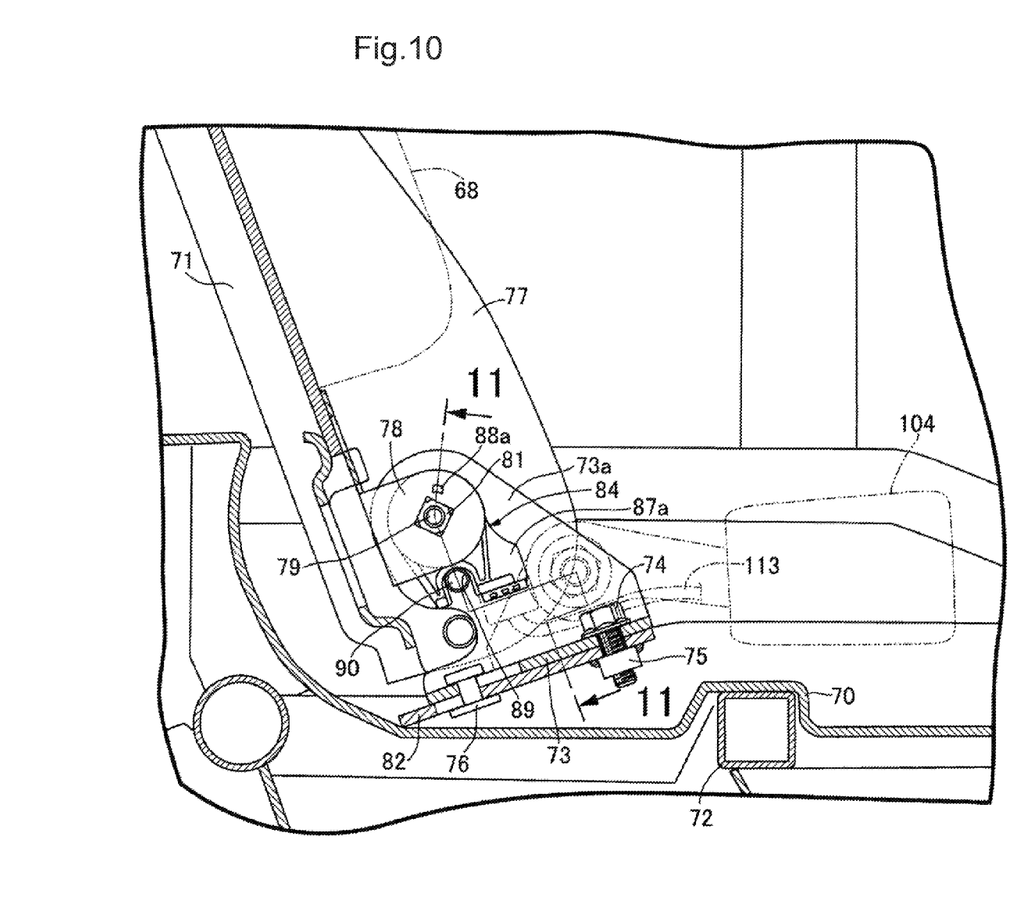
FIG. 10 is a longitudinal sectional view illustrating the configuration of a rotary switch, and is a sectional view taken along a line 10-10 in FIG. 11.
Figure 11:
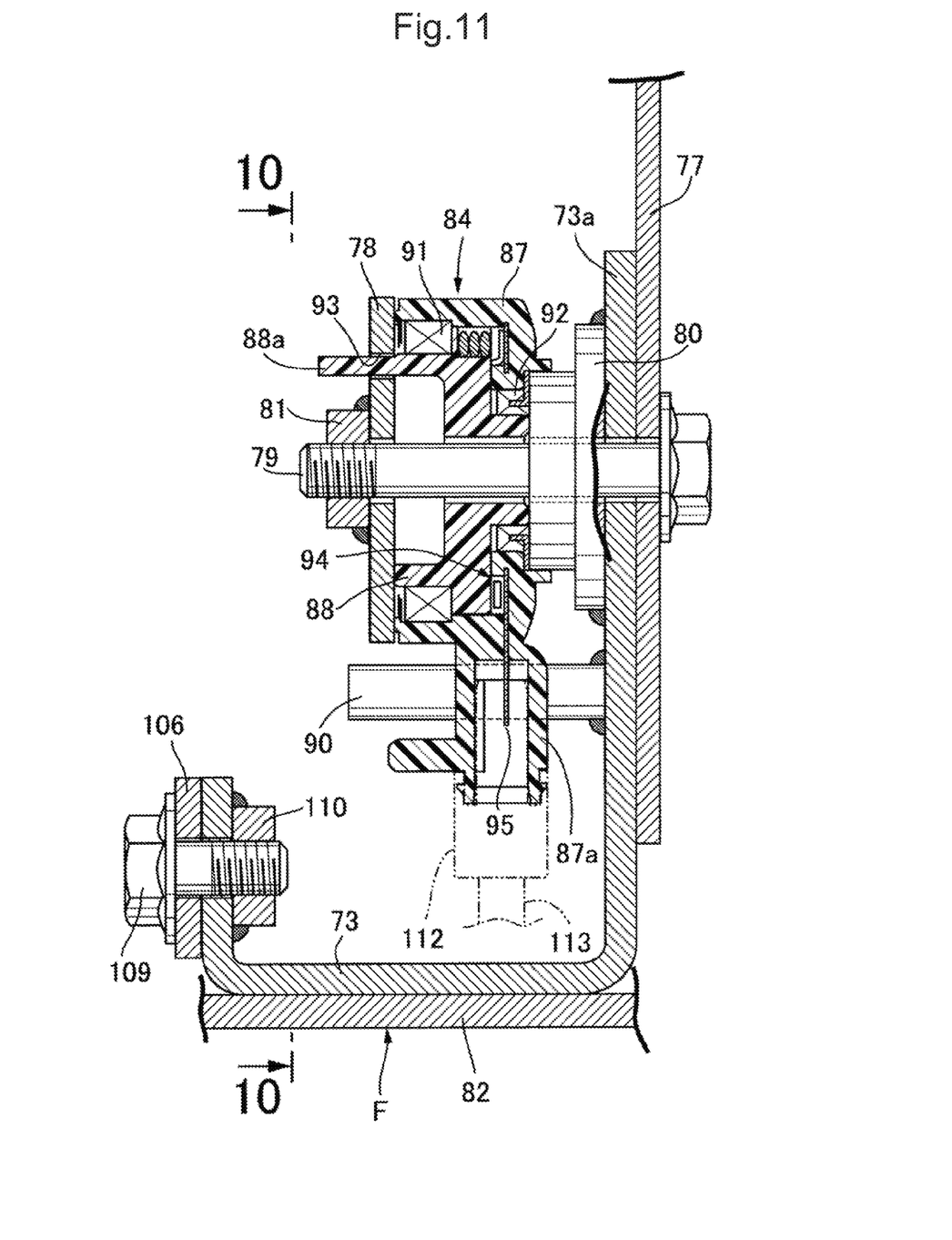
FIG. 11 is a sectional view taken along a line 11-11 in FIG. 10.

Referring also to FIGS. 9 to 11, a stay supporting portion 82 is provided on the rear part of the body frame F at a part corresponding to a rear part of each seat member 67, and support stays 73 each having a support plate portion 73a standing upward are secured on the stay supporting portion 82 with bolts 74, nuts 75, and rivets 76. The support stays 73 are disposed on both sides in the vehicle widthwise direction of the seat member 67 at positions corresponding to the rear part of the seat member 67.

In addition, side plate portions 77 protruding forward are arranged integrally on both sides in the vehicle widthwise direction of each seat back frame 71 so that they are disposed outside the respective support plate portions 73a in the vehicle widthwise direction, and the seat back frame 71 is provided with mounting stays 78 that extend continuously from the respective side plate portions 77 and are disposed inside the respective support plate portions 73a in the vehicle widthwise direction.

Sets of the side plate portion 77 and the mounting stay 78 disposed on both sides in the vehicle widthwise direction of each seat member 67 are each turnably supported by the support plate portion 73a of the corresponding support stay 73 via a bolt 79 as a spindle. A boss member 80 is fixedly attached on an inner surface of the support plate portion 73a, the bolt 79 is inserted into the side plate portion 77, the support plate portion 73a, the boss member 80, and the mounting stay 78, and an end part of the bolt 79 protruding inward in the vehicle widthwise direction from the mounting stay 78 is screwed into a nut 81 secured on the mounting stay 78.

A turning position of the mounting stays 78 relative to the support stays 73 is detected by a rotary switch 84. The rotary switch 84 is disposed on one side in the vehicle widthwise direction of each seat member 67 (in the illustrative embodiment, on the outer side in the vehicle widthwise direction of each seat member 67) coaxially with the bolt 79 so as to allow the bolt 79 to penetrate therethrough, and is disposed between the support plate portion 73a and the mounting stay 78 in the vehicle widthwise direction.

Cover members 85 and 86 designed to cover the support plate portions 73a, the side plate portions 77, and the mounting stays 78 are attached on both sides in the vehicle widthwise direction of each seat back frame 71. The cover member 85 disposed on the outer side in the vehicle widthwise direction of the seat back frame 71 is formed to cover the rotary switch 84 as well.

As shown in FIG. 11, each rotary switch 84 includes a base member 87, and an inner rotary 88 that is housed in the base member 87 so as to turn in conjunction with the corresponding mounting stay 78.

The base member 87 is sandwiched between the mounting stay 78 and the boss member 80, and an end part of the base member 87 on the support plate portion 73a side fits onto the boss member 80. A positioning recess portion 89 that opens toward the bottom is formed in a lower part of the base member 87, and a positioning rod 90 designed to be inserted into the positioning recess portion 89 is embedded in the support plate portion 73a.

Accordingly, by inserting the positioning rod 90 into the positioning recess portion 89, the base member 87 is positioned and supported on the support stay 73 on the support plate portion 73a side thereof so as to be incapable of rotation relative to the bolt 79, and a connector portion 87a that is directed downward when the base member 87 is in this positioned state is provided integrally to the base member.

The inner rotary 88 is housed in the base member 87 with annular seal members 91 and 92 interposed between itself and the base member 87, and an engagement protrusion 88a integrally provided to the inner rotary 88 is inserted into and engages with a locking hole 93 provided in the mounting stay 78, whereby the inner rotary 88 acts together with the mounting stay 78, i.e., the seat back frame 71.

A contact mechanism 94 configured to switch an electrical connection between a connected mode and a disconnected mode according to the movement of the inner rotary 88 around the axis of the bolt 79 is provided between the base member 87 and the inner rotary 88 and at a position sandwiched by the paired seal members 91 and 92 from both sides in their axial direction, and multiple terminals 95 extending continuously from a fixed contact point of the contact mechanism 94 are disposed inside the connector portion 87a.

Retractors 97 of seat belts 96 for restraining fellow passengers seated on the seat members 67 of the fellow passenger's seats 66 are respectively supported by stays 98 that are arranged on upper parts of the respective rear side frames 14 at portions close to the upper rear cross frame 17. In addition, the seat belts 96 extending from the respective retractors 97 are each inserted in sequence into an upper through anchor 99 and a lower through anchor 100 disposed below the upper through anchor 99.

Each seat belt 96 is inserted into an intermediate tongue plate 101, and an end tongue plate 102 is attached to a tip part of the seat belt 96. The intermediate tongue plate 101 is designed to detachably engage with a first buckle 103 that is placed on the seat member 67 of the corresponding fellow passenger's seat 66 on the inner side thereof in the vehicle widthwise direction, and the end tongue plate 102 is designed to detachably engage with a second buckle 104 that is placed on the seat member 67 on the outer side thereof in the vehicle widthwise direction.

The first buckle 103 is provided to a tip part of a first support arm 105 whose proximal end part is turnably supported, via a bolt 107 and a nut 108, by the support stay 73 of the seat member 67 located on the inner side in the vehicle widthwise direction. In addition, the second buckle 104 is provided to a tip part of a second support arm 106 whose proximal end part is turnably supported, via a bolt 109 and a nut 110, by the support stay 73 of the seat member 67 located on the outer side in the vehicle widthwise direction.

Moreover, the second buckle 104 placed on the outer side in the vehicle widthwise direction of the seat member 67 is provided with a seat belt switch 111 that is configured to detect whether the end tongue plate 102 engages with the second buckle 104 and thereby detect whether the seat belt 96 is fastened.

Further, a conductor 113 that is led from a connector 112 detachably mounted on the connector portion 87a of the rotary switch 84 and a conductor 114 that is led from the second buckle 104 so as to extend continuously from the seat belt switch 111 extend forward while being grouped together in a bundle.

Next, the operation of the illustrative embodiment will be described.

The seat member 22 constituting a part of the bench seat type riding seat 21 integrally having the driver's seat, the front passenger's seat, and the auxiliary seat disposed between the driver's seat and the front passenger's seat is supported on the body frame F while its position is variable between the closed position where the seat member allows an occupant to sit thereon while covering at least one (all in the illustrative embodiment) of the first maintenance space 41A, the second maintenance space 41B, and the housing space 42 from above; and the open position where the at least one (all in the illustrative embodiment) of the first maintenance space 41A, the second maintenance space 41B, and the housing space 42 is opened.

The seat supporting member 40 designed to support, from below, the seat member 22 in its closed position is provided on the body frame F so as to allow the seat member 22 to be attached to and detached from the seat supporting member 40, and the rear part of the seat member 22 and the intermediate part in the front-rear direction of the seat supporting member 40 are connected to each other via the swinging arms 52. This enables the seat member 22 in its open position to be located ahead of the seat supporting member 40 while not projecting greatly above the seat supporting member 40 and, by displacing the seat member 22 to its open position, it is possible to make the upper openings of the first maintenance space 41A, the second maintenance space 41B, and the housing space 42 widely open.

Further, the seat member 22 is provided with the seating sensor 51 configured to detect whether an occupant is seated on the seat member 22, and the sensor cord 55 extending continuously from the seating sensor 51 is routed along the corresponding swinging arm 52. Accordingly, it is not necessary to detach the sensor cord 55 at the time of displacing the seat member 22 to its open position, whereby the work of detaching the sensor cord 55 does not have to be performed and thus workability can be improved.

Further, the sensor cord 55 is held by the swinging arm 52 via the clip 56. Accordingly, the sensor cord 55 is held by the swinging arm 52 when the seat member 22 is displaced to its open position, whereby workability can be further improved.

Further, the positions of connection of the swinging arms 52 to the seat member 22 and to the seat supporting member 40 are set so that the front edge portion 22a of the seat member 22 in its open position may be located between the seat supporting member 40 and the instrument panel 57 disposed ahead of the seat supporting member 40. Accordingly, the seat member 22 in its open position is disposed by use of a large floor part located in front of the riding seat 21, whereby a large amount of displacement of the seat member 22 from the closed position to the open position can be secured.

Moreover, the seat supporting member 40 is provided on the body frame F so as to stand upward on the front floor 19, and the seat member 22 in its open position is supported by the swinging arms 52 and the front surface 40a of the seat supporting member 40 so that the front edge portion 22a of the seat member 22 in its open position may be placed at a position leaving a clearance above the upper surface of the front floor 19. Accordingly, the front edge portion of the seat member 22 in its open position does not make contact with the upper surface of the front floor 19, which makes it possible to prevent the front edge portion 22a of the seat member 22 from becoming soiled due to contact with the front floor 19.

Further, each swinging arm 52 made of metal is formed to extend linearly and to be turnable about the supporting point which is the unit 53 of connecting the one end part of the swinging arm 52 to the seat supporting member 40. Accordingly, when the seat member 22 is returned from the open position to the closed position, the seat member 22 can be returned to the closed position while being turned along the shape of a fan by the swinging arms 52, whereby workability can be further improved.

Further, the slotted hole 58 that extends long in the front-rear direction when the seat member 22 is in its closed position is provided in the one end part of each swinging arm 52 so as to allow the connecting shaft 53 as the connecting unit provided at the intermediate part in the front-rear direction of the seat supporting member 40 to penetrate therethrough, and the fitting protrusions 60 capable of fitting into the fitting holes 59, which are provided in the rear part of the seat supporting member 40 and open toward the front, protrude on the rear part of the seat member 22.

Accordingly, the seat member 22 can be slid in the front-rear direction by means of the slotted holes 58 in a state where the seat member 22 is located at or near its closed position, and thus the fitting protrusions 60 can be fitted into and released from the fitting holes 59 with the seat member 22 situated in its closed position. Thereby, it is possible to simplify the structure for supporting the seat member 22 on the seat supporting member 40 when the seat member is in its closed position.

Further, the pair of left and right fellow passenger's seats 66 is arranged on the loading space 20 located in the rear part of the body frame F, each fellow passenger's seat 66 includes: the seat member 67 that is provided on the seating-portion frame 70 supported by the body frame F; the first seat back portion 68 that is designed to support the lower part of the back of a fellow passenger seated on the seat member 67; and the second seat back portion 69 that is disposed above the first seat back portion 68 so as to support the upper part of the back of a fellow passenger seated on the seat member 67, the sets of the first seat back portion 68 and the second seat back portion 69 are respectively supported by the seat back frames 71, and each seat back frame 71 is supported on the body frame F while its mode is switchable between: the folded-down mode where the first and second seat back portions 68 and 69 are laid over the seat member 67; and the erected mode where the first and second seat back portions 68 and 69 stand behind the seat member 67. Moreover, the support stays 73 each having the support plate portion 73a standing upward are arranged on the body frame F at positions corresponding to the rear part of each seat member 67, the mounting stays 78 arranged on each seat back frame 71 are turnably supported by the support plate portions 73a via the bolts 79 respectively, and the rotary switch 84 configured to detect the turning position of the mounting stays 78 relative to the support stays 73 is disposed coaxially with the corresponding bolt 79 so as to allow the bolt 79 to penetrate therethrough. Accordingly, it is possible to reduce the space to be secured around the bolt 79 for the rotary switch 84 configured to detect variations in the turning position of the set of the seat back portions 68 and 69 relative to the seat member 67.

Further, each rotary switch 84 includes: the base member 87; the inner rotary 88 that is housed in the base member 87 so as to turn in conjunction with the corresponding mounting stay 78; and the seal members 91 and 92 that are interposed between the base member 87 and the inner rotary 88, and the base member 87 is supported on the corresponding support stay 73 side with the connector portion 87a of the base member 87 facing downward. Accordingly, it is possible to restrain water from entering the rotary switch 84 as much as possible, and thereby improve waterproof property.

Further, the seating-portion frame 70 is mounted on the floor portion 20a of the loading space 20 that is provided in the rear part of the body frame F of the vehicle for driving over rough terrain and opens toward the top. Accordingly, although the upside of the loading space 20 is open and therefore a large amount of water may accumulate in the loading space 20, the structure of the rotary switch 84 with improved waterproof property makes it possible to restrain water from entering the rotary switch 84.

Further, each rotary switch 84 is disposed between the support plate portion 73a of the corresponding support stay 73 and the mounting stay 78 disposed inside the support plate portion 73a in the vehicle widthwise direction. Accordingly, it is possible to protect the rotary switch 84 without a dedicated protection structure, and thereby simplify the protection structure.

In addition, the rotary switch 84 is disposed on the one side in the vehicle widthwise direction of each seat member 67, the second buckle 104 that is detachably engaged with the end tongue plate 102 provided to the seat belt 96 configured to restrain a fellow passenger seated on the seat member 67 is provided on the one side in the vehicle widthwise direction of the seat member 67, and the seat belt switch 111 configured to detect whether the seat belt 96 is fastened is provided in the second buckle 104. Accordingly, it is possible to improve workability in routing the conductors 113 and 114 extending continuously from the rotary switch 84 and the seat belt switch 111, and thereby improve maintainability.

Moreover, with the rotary switch 84 and the seat belt switch 111, it is possible to detect, at the same time, that the fellow passenger's seat 66 is in the mode where the set of the first and second seat back portions 68 and 69 stands upward on the seat member 67 and that the seat belt 96 is fastened. Thus, the seat belt fastening status of seats including the fellow passenger's seats 66 can be displayed on a meter display unit, whereby ease of operation can be enhanced.

While the embodiment of the present invention has been described above, the present invention is not limited to what is described in the above embodiment, and various design changes may be made without departing from the present invention described in the scope of claims.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE NUMERALS

19 FRONT FLOOR
21 RIDING SEAT
22 SEAT MEMBER

22a FRONT EDGE PORTION OF SEAT MEMBER
40 SEAT SUPPORTING MEMBER
40a FRONT SURFACE OF SEAT SUPPORTING MEMBER
41A, 41B MAINTENANCE SPACE
42 HOUSING SPACE
51 SEATING SENSOR
52 SWINGING ARM
53 CONNECTING SHAFT AS CONNECTING UNIT
55 SENSOR CORD
57 INSTRUMENT PANEL
58 SLOTTED HOLE
59 FITTING HOLE
60 FITTING PROTRUSION
F BODY FRAME

What is claimed is:

1. A riding seat structure for a passenger vehicle,
said vehicle comprising
a body frame having a housing space and a plurality of maintenance spaces formed therein;
said riding seat structure comprising
a riding seat including a seat member, wherein said seat member supported on said body frame such that a position thereof is variable between a closed position where said seat member allows an occupant to sit thereon while covering at least one of the maintenance spaces and the housing space from above, and an open position where the at least one of said maintenance spaces and said housing space is opened;
a seat supporting member designed to support, from below, said seat member in the closed position thereof provided on said body frame so as to allow said seat member to be attached to and detached from said seat supporting member; and
a swinging arm which connects a rear part of said seat member and an intermediate part of said seat supporting member in a front-rear direction to each other.

2. The riding seat structure for a passenger vehicle according to claim 1, further comprising
a seating sensor attached to said seat member, and configured to detect whether an occupant is seated on said seat member; and
a sensor cord extending continuously from said seating sensor, and routed along said swinging arm.

3. The riding seat structure for a passenger vehicle according to claim 2, wherein said sensor cord is held by said swinging arm.

4. The riding seat structure for a passenger vehicle according to claim 1, wherein said vehicle further comprise an instrument panel supported by said body frame, said instrument panel being disposed at a position ahead of said seat supporting member;
wherein said seat member comprises a front edge portion;
wherein a position of connection of said swinging arm to said seat member and to said seat supporting member is set so that said front edge portion of said seat member in the open position thereof is located at a position between said seat supporting member and the instrument panel.

5. The riding seat structure for a passenger vehicle according to claim 1, wherein said vehicle comprise an instrument panel supported by said body frame, and which is disposed at a position ahead of said seat supporting member;
wherein said seat member comprises a front edge portion;
wherein a position of connection of said swinging arm to said seat member and to said seat supporting member is set so that said front edge portion of said seat member in the open position thereof is located at a position between said seat supporting member and the instrument panel.

6. The riding seat structure for a passenger vehicle according to claim 1, wherein said vehicle comprise an instrument panel supported by said body frame, and which is disposed at a position ahead of said seat supporting member;
wherein said seat member comprises a front edge portion;
wherein a position of connection of said swinging arm to said seat member and to said seat supporting member is placed such that said front edge portion of said seat member in the open position thereof is located at a position between said seat supporting member and the instrument panel.

7. The riding seat structure for a passenger vehicle according to claim 4, wherein:
said vehicle comprises a front floor supported on said body frame;
said seat supporting member is provided on said body frame so as to stand upward on the front floor; and
said seat member in the open position thereof is supported by said swinging arm and a front surface of said seat supporting member so that said front edge portion of said seat member in the open position thereof is placed at a position leaving a clearance above an upper surface of said front floor.

8. The riding seat structure for a passenger vehicle according to claim 1, wherein said swinging arm is formed of material comprising metal; and
wherein said swinging arm is operable to turn about a supporting point which is a connecting unit, which connects one end part of said swinging arm to said seat supporting member.

9. The riding seat structure for a passenger vehicle according to claim 2, wherein said swinging arm is formed of material comprising metal; and
wherein said swinging arm is operable to turn about a supporting point which is a connecting unit, which connects one end part of said swinging arm to said seat supporting member.

10. The riding seat structure for a passenger vehicle according to claim 3, wherein said swinging arm is formed of material comprising metal; and
wherein said swinging arm is operable to turn about a supporting point which is a connecting unit, which connects one end part of said swinging arm to said seat supporting member.

11. The riding seat structure for a passenger vehicle according to claim 4, wherein said swinging arm is formed of material comprising metal; and
wherein said swinging arm is operable to turn about a supporting point which is a connecting unit, which connects one end part of said swinging arm to said seat supporting member.

12. The riding seat structure for a passenger vehicle according to claim 5, wherein said swinging arm is formed of material comprising metal; and
wherein said swinging arm is operable to turn about a supporting point which is a connecting unit, which connects one end part of said swinging arm to said seat supporting member.

13. The riding seat structure for a passenger vehicle according to claim 8, wherein:
said swinging arm has a slotted hole formed in one end portion thereof;
said connecting unit comprises a connecting shaft;

the slotted hole extends along the front-rear direction when said seat member is in the closed position so as to allow the connecting shaft provided at the intermediate part of said seat supporting member in the front-rear direction to penetrate therethrough;

said seat member comprises a fitting protrusion formed thereon at a rear part thereof;

said seat supporting member has a fitting hole formed in a rear part thereof; and said fitting protrusion is configured to fit into said fitting hole.

14. A vehicle comprising
a seat member;
a body frame having a housing space and a maintenance space formed therein;
a seat supporting member provided on said body frame; and
a swinging arm which extends between said seat member and said seat supporting member, and which connects a rear part of said seat member with said seat supporting member at an intermediate portion of the seat supporting member;
wherein said seat member is operable to change a position thereof between a closed position where the maintenance spaces and the housing space are covered and an open position where the maintenance space and the housing space are opened.

15. The vehicle according to claim 14, further comprising
a seating sensor attached to said seat member, and configured to detect whether an occupant is seated on said seat member; and
a sensor cord extending continuously from said seating sensor, and routed along said swinging arm.

16. The vehicle according to claim 14, further comprising an instrument panel supported by said body frame, said instrument panel being disposed at a position frontwardly of said seat supporting member;
wherein said seat member comprises a front edge portion;
wherein a position of connection of said swinging arm to said seat member and to said seat supporting member is placed such that said front edge portion of said seat member in the open position thereof is located at a position between said seat supporting member and the instrument panel.

17. The vehicle according to claim 14, wherein:
said seat supporting member has a fitting hole formed therein;
said seat member comprises a fitting protrusion formed on rear part thereof; and
said fitting protrusion is configured to fit into said fitting hole.

18. A vehicle comprising
a seat member having a fitting protrusion formed thereon at a rear portion thereof;
a body frame having a housing space and a maintenance space formed therein;
a seat supporting member provided on said body, said seat supporting member having a fitting hole formed in a rear portion thereof; and
a swinging arm which extends between a rear part of said seat member and an intermediate part of said seat supporting member, and which connects said seat member and said seat supporting member to each other;
wherein said seat member is operable to change a position thereof between a closed position where the maintenance space and the housing space are covered from above, and an open position where the maintenance space and the housing space are opened; and
wherein when seat member is placed in the closed position thereof, said fitting protrusion is configured to fit into said fitting hole.

19. The vehicle according to claim 18, further comprising
a seating sensor attached to said seat member, and configured to detect whether an occupant is seated on said seat member; and
a sensor cord extending from said seating sensor,
wherein said sensor cord is routed along and held by said swinging arm.

20. The vehicle according to claim 18, further comprising
a connecting shaft;
wherein said swinging arm has a slotted hole formed in one end portion thereof; and
wherein said slotted hole extends along the front-rear direction when said seat member is placed the closed position so as to allow the connecting shaft to penetrate therethrough.

* * * * *